June 16, 1931. E. W. HOLMES 1,809,939
AUTOMOBILE LIFT
Filed Aug. 27, 1928   2 Sheets-Sheet 1
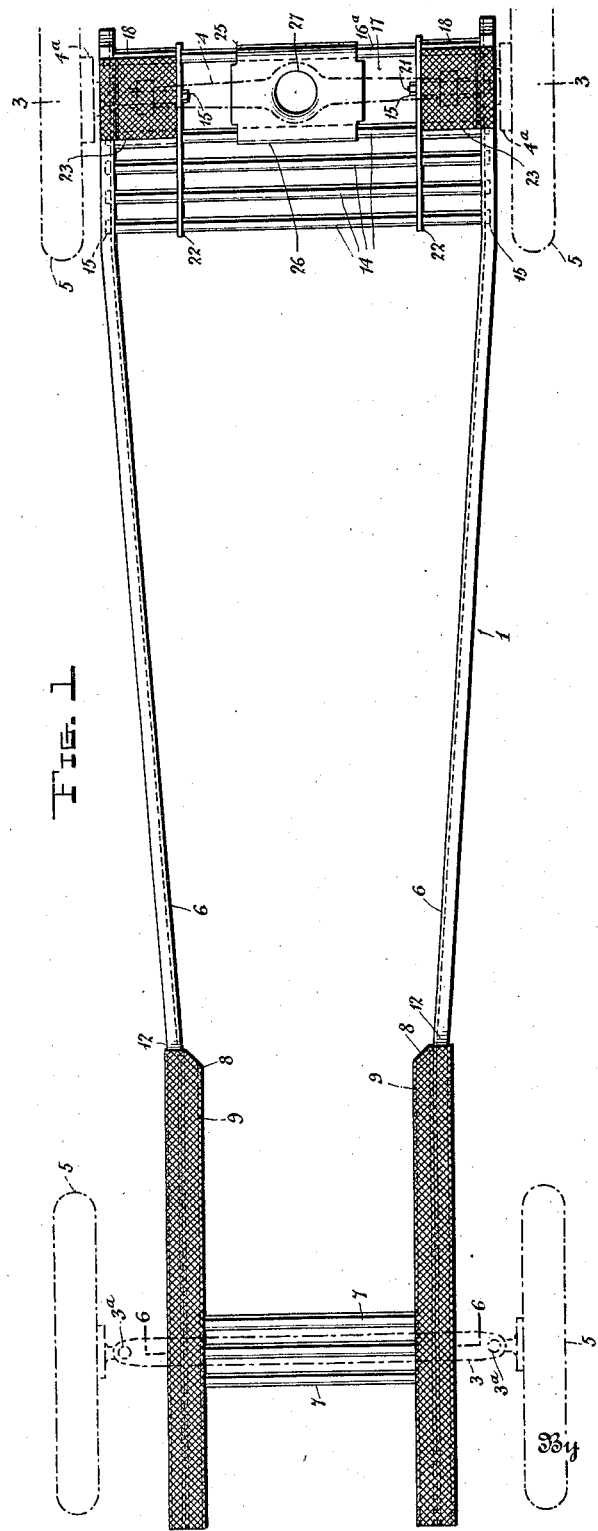
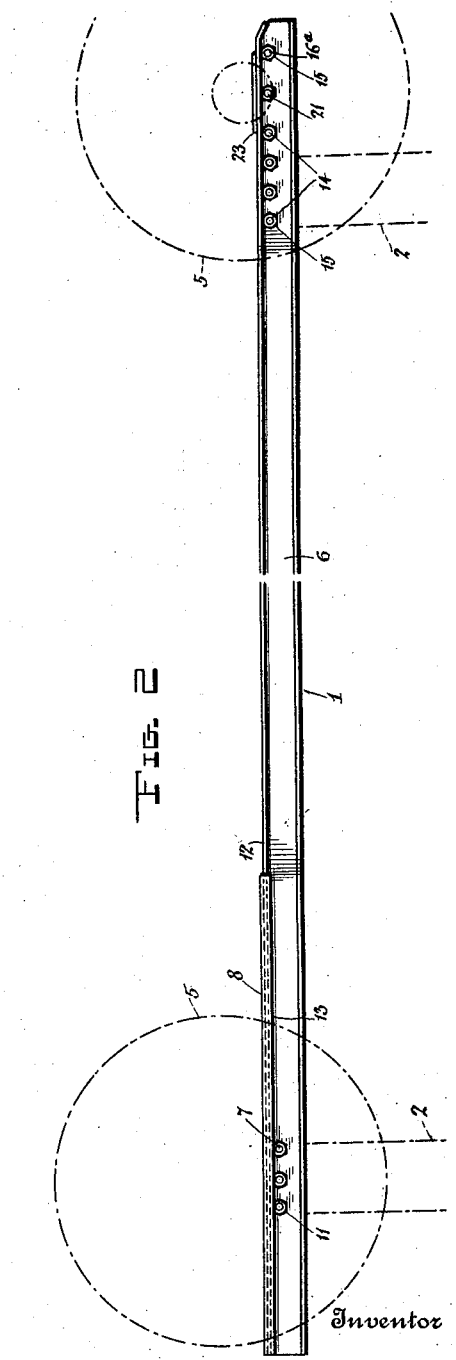
Inventor
Ernest W. Holmes.
By
Attorney

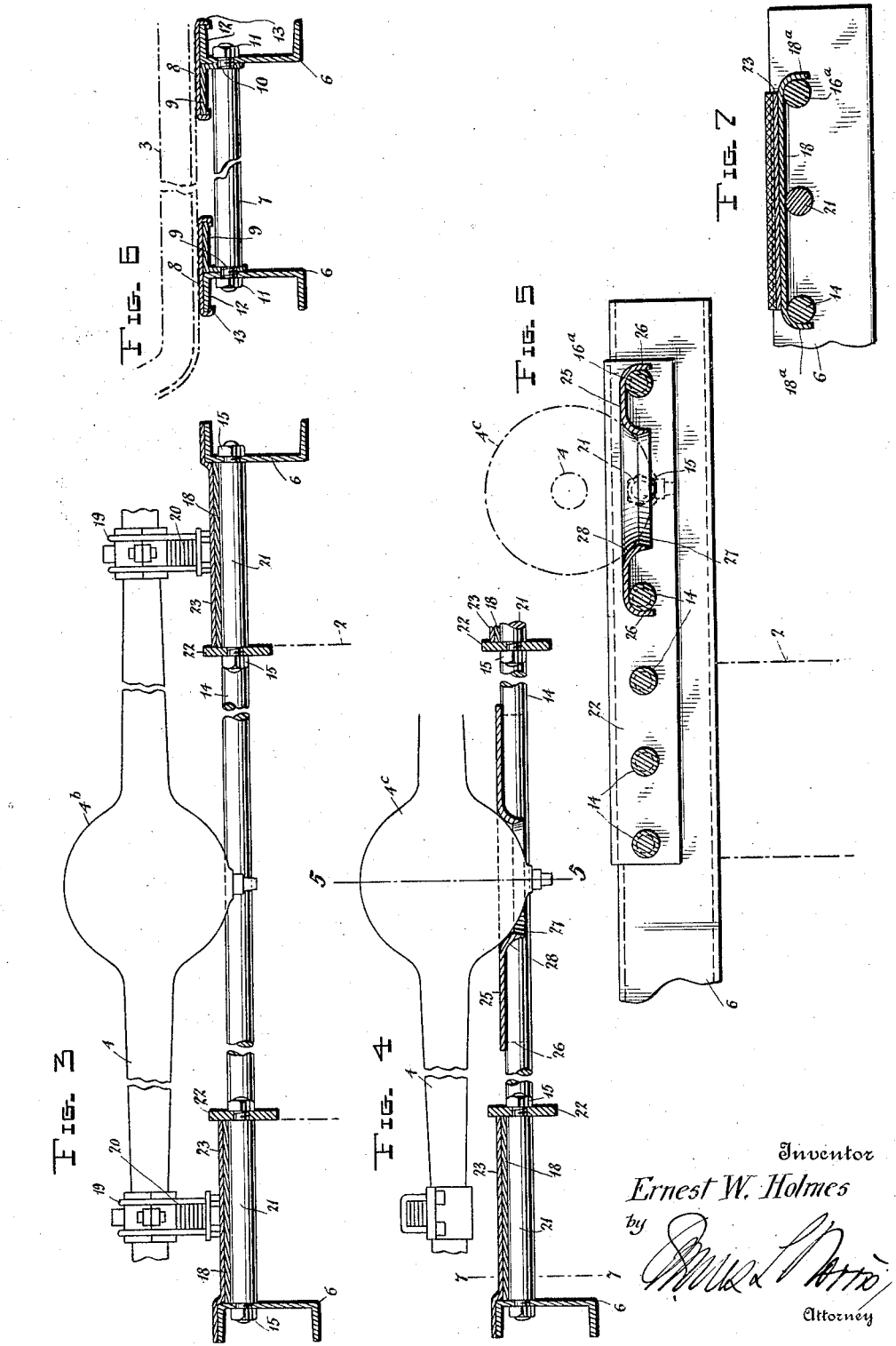

Patented June 16, 1931

1,809,939

UNITED STATES PATENT OFFICE

ERNEST W. HOLMES, OF CHATTANOOGA, TENNESSEE, ASSIGNOR TO ERNEST HOLMES COMPANY, OF CHATTANOOGA, TENNESSEE, A CORPORATION OF TENNESSEE

AUTOMOBILE LIFT

Application filed August 27, 1928. Serial No. 302,361.

The present invention relates to improvements in automobile lifts and more especially to those of the class embodying a frame or cradle adapted to engage beneath the front and rear axles of an automobile and having means for elevating it and thereby lifting the automobile, while resting on the frame or cradle, to a suitable height above a floor or ground to provide convenient access to the automobile and particularly to the chassis and under side thereof for the purposes of lubrication, inspection, adjustment or repair, an example of an automobile lift of this general class being shown and described in my copending application Serial No. 224,657 filed Oct. 7, 1927.

One of the objects of the present invention is to provide an improved crane or cradle which is applicable universally to the lifting of automobiles of all types now in use, irrespective of whether the rear springs are slung under the rear axle or rest on the top thereof, and which will accommodate automobiles either with or without a truss rod beneath the rear axle.

Another object is to provide a lifting frame or cradle of this character which will support different types of automobiles thereon with stability so that an automobile while lifted will be restrained from rocking laterally and there will be no danger of displacement of the automobile or accidental dropping of the automobile from the lift while elevated.

Another object is to provide an automobile lifting frame or cradle which is adapted to lift the rear portions of automobiles by engaging either the spring clips in those cases where the springs are slung under the rear axle or by engaging the differential housing in the middle of the rear axle in those cases where the rear springs are mounted on top of the rear axle or obstructions preclude lifting the rear axle by engaging it toward its outer ends.

A further object of the invention is to provide a lifting frame or cradle of this character which provides convenient access to the oil draining plug usually fitted in the bottom of the differential housing of the rear axle, whereby the operation of removing the oil from the housing before replacing it with fresh oil is facilitated.

To these and other ends, the invention consists in certain improvements and combinations and arrangements of parts, all as will be hereinafter more fully described, the features of novelty being pointed out particularly in the claims at the end of the specification.

In the accompanying drawings:—

Figure 1 is a top plan view of an automobile lifting frame or cradle constructed in accordance with the present invention, the positions of the front and rear axles of an automobile with respect to the frame or cradle being indicated in dotted lines;

Figure 2 is a side elevation of the frame or cradle shown in Figure 1, the frame or cradle being shown shortened by breaking away the middle thereof;

Figure 3 represents, on an enlarged scale, a section taken on the line 3—3 of Figure 1 and showing the manner of lifting an automobile rear axle by engagement of the frame or cradle with the underslung springs or spring clips of the axle;

Figure 4 is a view similar to Figure 3 but showing the manner of lifting an automobile rear axle by engagement of the frame or cradle with the differential housing thereof;

Figure 5 represents a transverse section taken on the line 5—5 of Figure 4, the automobile rear axle being shown in dotted lines;

Figure 6 represents a section taken on the line 6—6 of Figure 1 but having its central portion broken away, it illustrating the manner in which the frame or cradle engages the front axle of an automobile to lift it; and Figure 7 represents a section taken on the line 7—7 of Figure 4, looking toward the left in that figure.

Similar parts are designated by the same reference characters in the several views.

The present invention is applicable to automobile lifts of various types employing a frame or cradle adapted to be elevated by suitable lifting mechanism and which is engageable with the under sides of the front and rear axles of an automobile to lift or elevate it. The preferred embodiment of the invention is shown in the accompanying drawings as applied to an automobile lift of one type but it to be understood that equivalent constructions may be used and such will be included within the scope of the claims.

In the present instance, the invention is shown applied to an automobile lift of the type shown and described in my copending application hereinbefore referred to and to which reference is made for a complete disclosure of one of many types of automobile lifts to which the invention may be applied, it being deemed sufficient to explain that the automobile lift of the type referred to comprises a frame or cradle 1 which is sufficiently narrow in width and shallow in height to permit an automobile to be brought into a position above it, the frame or cradle being sufficiently long to extend beneath or beyond the front and rear axles of the automobile, and suitable elevating means, such for example as the linked or articulated columns 2 shown and described in my aforesaid copending application, serves to lift the frame or cradle and thereby bring it up against the under sides of the front and rear axles 3 and 4 of the automobile so that the automobile axles will rest thereon, and as the lifting or elevating motion of the frame or cradle continues, the automobile will be lifted or elevated to a suitable height above the ground or a floor to render conveniently accessible the chassis of the automobile and especially the mechanisms thereof beneath the automobile so that they can be easily lubricated, inspected, adjusted or repaired by a mechanic or attendant, the wheels 5 of the automobile projecting beyond the sides of the frame or cradle above the floor or ground and being free for inspection, removal or adjustment.

According to the present invention, the end of the lifting frame or cradle which is to support the front axle 2 of the automobile is so constructed that it will engage the relatively straight drop in the axle which is usually formed between the steering knuckles so that the front axle will be supported on the frame or cradle in a manner which will preclude lateral slipping or displacement of the axle and the front end of the automobile will be supported in a level position transversely and rocking of the automobile about a longitudinal axis will be prevented. To accomplish these results, the frame or cradle, which comprises a pair of longitudinal side members 6 preferably of channel form, as shown, and connected rigidly by a suitable number of tie rods 7 which extend between them and connect and space them rigidly adjacent to their forward ends, are spaced apart a distance equal to or somewhat less than the length of the straight drop portion of the front axle of an automobile and the upper edge of these portions of the side rails are provided with plates 8 and top or axle engaging surfaces of which are serrated or roughened to provide anti-slip surfaces. Preferably, the tread plates 8 are applied to the tops of the side rails by applying angle irons 9 to the inner side of the side rails and securing them rigidly in place by the tie rods 7 which are shouldered at their ends, the shoulders 10 on these tie rods when they are tightened by the nuts 11 threaded on their reduced outer ends, bearing against the vertical flanges of the angle irons 9 which lie against the inner sides of the side rails 6. The upper or inwardly extending flanges of the angle irons are alined with or lie in the same horizontal plane with the out-turned flanges 12 of the side rails 6, and the tread plates 8 are preferably made of sufficient width to overlie the horizontal flanges of the angle irons and the top flanges 12 of the side rails 6, and the tread plates may be firmly secured on these flanges by bending the longitudinal edges of the tread plates beneath the edges of the flanges of the angle irons and the flanges 12, as indicated at 13 in Figure 6.

By spacing apart the tread plates 8 a distance equal to or somewhat less than the transverse length of the horizontal drop portion of an automobile front axle, such axle is caused to rest evenly on the tread surfaces 8, as indicated by the dotted lines in Figure 6, and hence the front end of the automobile will be supported evenly on the frame or cradle and lateral slipping or displacement of the front axle, as might otherwise occur if the frame or cradle engaged the front axle nearer the front wheel knuckles or forks 3ᵃ which usually slope upwardly from the straight drop portion of the axle, is prevented. Furthermore, the relatively narrow width of the front axle supporting end of the frame or cradle enables the front wheels of an automobile supported on the cradle to be turned or steered through their normal angle and hence the steering mechanism of the automobile can be readily inspected, adjusted or repaired.

The lifting frame or cradle according to the present invention is also constructed so that it is applicable universally to the lifting of the rear ends of automobiles having rear axles of different types, irrespective of whether the rear springs are slung under the axle or are spaced at different distances from the center thereof or whether the rear springs are mounted to rest on top of the rear axle, or whether the rear axle is provided with a truss rod extending beneath the differential housing or obstructions such as brake rods, levers, muffler or exhaust pipes or the like are in proximity to the rear axle. In order to adapt the lifting frame or cradle universally to these various types of automobiles, the side rails 6 of the frame or cradle are arranged to extend in divergent relation as they proceed rearwardly from the front axle supporting treads 8, so that the front portion and the widened rear portion of the lifting frame or cradle will resemble in its general form and dimensions the chassis frame of an automobile. The rear end of the frame or cradle is preferably widened to the extent that it will occupy nearly the entire length of the rear axle of an automobile between the brake drums 4ª thereof, this being the portion of the frame or cradle of maximum width, and the rear ends of the side rails 6 composing the frame or cradle are rigidly connected and maintained in such spaced relation by a suitable number of tie bolts 14 the ends of which may be reduced in diameter and extended through the vertical flanges of the side rails 6 and threaded at their outer ends to receive nuts 15 adapted to bear against the outer sides of the side rails 6, the shoulders formed by the reduced ends of the tie bolts abutting against the inner sides of the side rails 6 and thereby spacing them. One of the tie bolts 16ª is spaced widely from the remainder of the tie bolts at the rear end of the frame or cradle and it provides a relatively wide space 17 which will occupy a position centrally or substantially so beneath the rear axle of an automobile when the same is properly mounted on the frame or cradle, and supporting plates 18, which are adapted to support the clips 19 of springs 20 which are slung under the rear axle of an automobile, are extended inwardly from the side rails 6 of the frame or cradle and rest removably on and are thus supported by the transverse tie rod 16ª and the tie rod 14 which is adjacent thereto, the forward and rear edges of these plates being preferably bent downwardly, as at 18ª to abut against said tie rods 14 and 16ª and thus prevent displacement of these plates in a forward or rearward direction. Preferably, short supplemental bolts 21 extend from the respective side rails 6 to vertical plates 22 through which the tie rods 14 and 16ª extend, these bolts being shouldered at their ends so that when they are tightened they serve to lock the vertical plates 22 rigidly in fixed relation with the side rails, and these supplemental bolts also provide additional support for the plates 18. The inner edges of the plates 18 are arranged to abut against the respective vertical plates 22 below their upper edges, and the outer edges of the plates 18 are arranged to abut against the inner sides of the respective side rails 6, so that the plates 18 are thus removably but securely held in their proper positions. A thin plate 23 having a roughened or other anti-slip surface thereon is welded or otherwise secured to the top of each supporting plate 18 to engage the rear spring clips, the outer portions of these plates being preferably offset upwardly and extended to overlie the top flanges of the respective side rails, as shown in Fig. 3. The plates 18 and the anti-slip plates 23 thereon extend inwardly from the respective side rails 6 for a distance sufficient to enable them to receive the spring clips on the rear axles of various automobiles in which the spacing of the spring clips toward or from the outer ends of the axles varies through a considerable range, the outer portions of the plates 18 or the anti-slip plates thereon receiving the spring clips in those cases where the spring clips are arranged near the outer ends of the axle and the inner portions of these plates receiving the spring clips in those cases where they are located nearer to the center of the axle, and when the rear axle of an automobile is supported on the frame or cradle by the resting of its spring clips on the plates 23, rocking of the rear axle about an axis longitudinal of the automobile is precluded as both ends of the axle will be supported firmly and evenly by the horizontal alined plates 18 and lateral slipping or displacement of the rear end of the automobile with respect to the frame or cradle will be prevented by the grip of the anti-slip surfaces of the plates 18 upon the spring clips.

The supporting plates 18 span the relatively wide space 17 between the tie rod 16ª and the adjacent tie rod 14 so that when the rear axle of an automobile is supported on the plates 18, the differential housing 4ᵇ of the rear axle will be located centrally or substantially so above the space 17 and the drain plug therein is thus rendered accessible for removal so that the oil or lubricant in the differential housing can be drained therefrom preparatory to its renewal. In those cases where brake rods, levers, muffler or exhaust pipes or other parts of an automobile are beneath or adjacent to the rear axle so as to preclude lifting of the axle by the direct engagement of the plates 18 with the spring clips or other portion of the axle, the plates 18 will provide supports on which blocks may be placed so that the blocks will clear the obstructions and will engage the rear axle and thus support it on the plates 18.

In order to adapt the frame or cradle to the lifting of rear axles wherein the rear springs are mounted above the axle or a tie rod extends beneath the axle, a plate 25 is provided which is removably mounted on the tie rod 16ª and the adjacent tie rod 14 and is adapted to bridge or span the space 17 between these tie rods. As shown, the plate 25 has flanged or downturned front and rear edges 26 which are adapted to extend partially around the adjacent tie rods 14 and 16ª so as to prevent displacement of the plate 25 from these tie rods, in a direction forwardly or rearwardly of the frame or cradle. This plate 25 may be placed removably on the top of the adjacent tie rods 14 and 16ª and it has a central opening 27 therein and an annular flared portion 28 surrounding it. The plate 25 is adapted to receive the lower portion of the differential casing 4ᶜ of an automobile rear axle which for example may have the rear springs mounted on its upper side or a tie rod may extend beneath the axle, as in some automobiles. The flared portion 28 of the plate 25 will center the differential housing on the plate and it will obtain a sufficient grip upon the differential housing to prevent displacement of the differential housing from the plate in either a longitudinal or a transverse direction and it will substantially prevent rocking of the differential housing on the plate and hence stability of the rear end of the automobile while lifted by the frame or cradle will be obtained notwithstanding that the rear axle thereof is supported only at its center. The relatively large central opening 27 in the plate 25 exposes the drain plug usually provided in the bottom of the differential housing so that the plug is conveniently accessible for removal and replacement incident to the change of oil or lubricant in the differential housing.

The plate 25, which rests removably on the tie rod 16$^a$ and the adjacent tie rod 14 may be removed when the automobile is to be lifted by the engagement of the plates 18 with the spring clips or spring clip bolts of underslung rear springs, the removal of this plate leaving the differential housing free and clear and easily accessible in or above the relatively large space 17.

As this space 17 is offset rearwardly from the adjacent lifting column 2, such column will not obstruct said space or otherwise interfere with the operation of draining the oil or lubricant from the rear axle housing, as the overhang of this space in rear of said column will enable a bucket or other receptacle to be placed beneath the differential housing to receive the oil or lubricant therefrom.

The present invention provides an automobile lifting frame or cradle which is capable of accommodating universally automobiles of all types now in general use, and of supporting such automobiles thereon in a manner which will insure rigidity, stability and freedom of danger of slipping or other displacement.

The relatively narrow front axle supporting end of the lifting frame is of such width as to engage the straight drop portion of the front axles of automobiles as now commonly made, thereby supporting the front end of the automobile rigidly and evenly on both sides and precluding rocking of this portion of the automobile on a longitudinal axis, and as the upwardly sloping ends of the axle will be beyond the sides of this portion of the frame, there will be no tendency of the axle to slip laterally in either direction or to cause spreading of the side rails of the frame, as would exist if this portion of the frame were made wider and either or both of the upwardly and outwardly sloping portions of the front axle engaged the frame.

By shaping the lifting frame so that it widens as it proceeds rearwardly, so that it will occupy substantially the full width of the space between the usual brake drums on the rear axles of automobiles, a relatively wide support is afforded which is capable of engaging the spring clips or the bolts thereof of underslung springs which are attached to the underside of the axle closely adjacent to the brake drums near the outer ends thereof, and by extending horizontal supporting plates inwardly from the outer side rails of this widened rear portion of the frame, extended supporting surfaces are afforded which will accommodate the spring clips or the bolts thereof which are located nearer, more or less, to the center of the axle, or will accommodate blocks which may be placed thereon to support the rear axle, and these plates will support the rear end of the automobile rigidly and will preclude rocking thereof on its longitudinal axis.

The plate provided between these outer plates to support rear axles of automobiles by engaging the under side of the central differential housing thereof is depressed and hence will prevent accidental displacement of the differential housing therefrom and by embracing a portion of the housing, it will substantially prevent rocking of the rear end of the lifted automobile about its longitudinal axis. As the depressed or central portion of this plate is provided with a relatively large opening which will expose the bottom of the differential housing and the drain plug therein, the operations of removing and replacing said plug and of drawing off the oil or lubricant into a bucket or other receptacle may be performed with facility.

I claim:—

1. An automobile lifting frame adapted to receive above it, the front and rear axles of an automobile, said frame having a relatively narrow portion of a width to engage the flat dropped portion of the automobile front axle, the sides of the frame diverging as they proceed rearwardly and having a rear portion of a width substantially equal to the length of the automobile rear axle, and axle supporting plates extending inwardly from the sides of the rear portion of the frame.

2. An automobile lifting frame for supporting thereon the front and rear axles of an automobile, comprising side rails having out-turned horizontal flanges at their upper edges, angle irons secured to the inner sides of said rails and having inturned flanges thereon alined horizontally with the outer-turned flanges of said side rails, and axle engaging plates each applied to the tops of the out-turned and inturned flanges of the respective side rail and having their edges turned over the edges thereof.

3. An automobile lifting frame for supporting thereon the front and rear axles of an automobile, comprising a pair of laterally spaced side rails, a plurality of transverse tie members connecting said rails, and a pair of axle supporting plates extending inwardly from the side rails and overlying and supported by said tie members.

4. An automobile lifting frame for supporting thereon the front and rear axles of an automobile, comprising a pair of laterally spaced side rails, longitudinally spaced transversely extending tie members connecting them, and a pair of axle supporting plates extending inwardly from the respective side rails over the space between the tie members and supported at their inner portions by said tie members.

5. An automobile lifting frame for supporting thereon the front and rear axles of an automobile, comprising a pair of transversely spaced supporting members for supporting the rear axle toward its ends, and a member between said supporting members having a vertical aperture therein and adapted to support the rear axle by engagement of the surrounding edge of said aperture with the differential housing of the axle.

6. An automobile lifting frame comprising a pair of laterally spaced side rails, transverse longitudinally spaced tie members extending between and connecting said rails, a pair of transversely spaced axle supporting members extending inwardly from the respective side rails and above the space between said tie members and supported at their inner ends by said tie members, and an intermediate axle supporting member mounted on the tie members between said pair of axle supporting members and bridging the space between the tie members.

7. An automobile lifting frame having mounted thereon an axle supporting member having an annular depression in its upper side to engage the differential housing of an automobile rear axle, and having an opening therein below said depression to expose therethrough the bottom of the differential housing.

8. An automobile lifting frame having a pair of longitudinally spaced transverse members, a plate of a length to rest upon said members and to bridge the space between them, opposite ends of the plate having flanges to abut against the respective transverse members, the plate having a substantially central annular depression shaped to receive the lower portion of the differential housing of an automobile rear axle and the bottom of said depression being open to provide access to the bottom of a differential housing resting in said depression.

In testimony whereof I have hereunto set my hand.

ERNEST W. HOLMES.